United States Patent [19]

Bosch et al.

[11] 3,796,969

[45] Mar. 12, 1974

[54] FREQUENCY CONTROL AND SYNCHRONIZATION OF GUNN OSCILLATIONS

[75] Inventors: Berthold Bosch; Horst Pollmann, both of Ehrestein/Ulm, Germany

[73] Assignee: Telefunken Patentverwertungsgesellschaft m.b.H, Ulm/Donau, Germany

[22] Filed: June 2, 1966

[21] Appl. No.: 554,822

[30] Foreign Application Priority Data

| | | |
|---|---|---|
| June 12, 1965 | Germany | 28781 |
| Aug. 12, 1965 | Germany | 29198 |
| Nov. 25, 1965 | Germany | 29847 |
| Dec. 4, 1965 | Germany | 29940 |

[52] U.S. Cl. ................ 332/16 R, 307/322, 330/4.9, 331/107 G, 332/52

[51] Int. Cl. ........................ H03b 7/14, H03c 3/22

[58] Field of Search ..................... 332/1, 16, 31, 52; 307/205, 322, 299; 331/107 G; 330/4.9

[56] References Cited

UNITED STATES PATENTS

| | | | |
|---|---|---|---|
| 3,422,289 | 10/1969 | Atalla et al. | 307/299 |
| 3,134,949 | 5/1964 | Tiemann | 307/322 X |
| 3,365,583 | 1/1968 | Gunn | 331/107 G |

OTHER PUBLICATIONS

Thim et al., "Microwave Amplification in a D.C.–Biased Bulk Semiconductor," Vol. 7, No. 6, Applied Physics Letters, pp. 167–168, Sept. 15, 1965.

*Primary Examiner*—Alfred L. Brody
*Attorney, Agent, or Firm*—Spencer and Kaye

[57] ABSTRACT

An arrangement for controlling the oscillation frequency of a Gunn effect device by applying thereto high frequency signals which act to vary the operating voltage thereacross between a value which exceeds the critical oscillation-producing voltage of the oscillator and a value which is less than such critical voltage so as to control the frequency of the oscillations produced by the oscillator.

21 Claims, 22 Drawing Figures

INVENTORS
Berthold Bosch &
Horst Pollmann

BY Spencer & Kaye
ATTORNEYS

INVENTORS
Berthold Bosch &
Horst Pollmann
BY Spencer & Kaye
ATTORNEYS

INVENTORS
Berthold Bosch &
Horst Pollmann

BY Spencer & Kaye
ATTORNEYS

INVENTORS
Berthold Bosch &
Horst Pollmann

BY Spencer & Kaye
ATTORNEYS

INVENTORS
Berthold Bosch &
Horst Pollmann

BY Spencer & Kaye
ATTORNEYS

INVENTORS
Berthold Bosch &
Horst Pollmann

BY Spencer & Kaye
ATTORNEYS

INVENTORS
Berthold Bosch &
Horst Pollmann
BY Spencer & Kaye
ATTORNEYS

INVENTORS
Berthold Bosch &
Horst Pollmann

BY Spencer & Kaye
ATTORNEYS

INVENTORS
Berthold Bosch &
Horst Pollmann

BY Spencer & Kaye
ATTORNEYS

FREQUENCY CONTROL AND SYNCHRONIZATION OF GUNN OSCILLATIONS

The present invention relates to oscillators, and more particularly to oscillators employing the Gunn effect, in which a sample of a preferably III-V compound semiconductor crystal having a predetermined size is excited to produce oscillations when an electric field having a strength which exceeds a critical value is applied across the crystal.

The recently discovered "Gunn effect", which is employed for the production of electromagnetic oscillations, is described in an article entitled "Microwave Oscillations of Current In III-V-Semiconductors" appearing on pages 88 to 91 of the publication Solid-State Communications (No. 1,1963).

In order to create this effect, it is only necessary to provide ohmic contacts on opposite sides of a sample made of preferably an n-type III–V compound semiconductor crystal having a suitable thickness, in the range of 10 to 200 $\mu$ for example. If a d.c. electric field having a strength which exceeds a critical value is then applied between the contacts, instabilities having the form of oscillations will be induced in the current flowing through the crystal. In order to create this effect, it is not necessary to provide any pn-junction or exterior magnetic field for the crystal.

Experiments with this effect have revealed that the period of the current oscillations in the crystal bears a direct relationship to the transition time of the charge carriers through the crystal. It has thus far been possible to produce continuous wave oscillations of this type having output power levels of some tens of milliwatts.

Although there is not yet a complete theory to explain the mechanism of the Gunn effect, it is presently believed to be due to the fact that a sufficiently high electric field through the crystal produces a region of negative differential charge carrier mobility within the crystal.

It is a primary object of the present invention to produce an improved oscillator operating according to the Gunn effect.

A more specific object of the present invention is to produce such an oscillator capable of producing oscillations having controllable frequency.

A still further object of the present invention is to provide an oscillator of this type which is suitable for commercial use.

These and other objects are achieved, according to the present invention, by the provision of oscillation control means in combination with a semiconductor crystal of given dimensions, made of preferably a III–V compound of the type which produces e.g. microwave frequency current oscillations having a predetermined natural oscillation frequency by the Gunn effect when a sufficient voltage is applied between two opposed contact surfaces thereof to produce an electric field extending between these surfaces and having a field strength which exceeds a critical value. These oscillation control means are connected between these crystal surfaces for applying a high frequency voltage therebetween. This voltage is given a value which is sufficient to vary the field strength in the crystal between an amount which is less than the critical value and an amount which exceeds the critical value for controlling the frequency of the current oscillations produced in the crystal.

Additional objects and advantages of the present invention will become apparent upon consideration of the following description when taken in conjunction with the accompanying drawings in which.

Figure 3A:
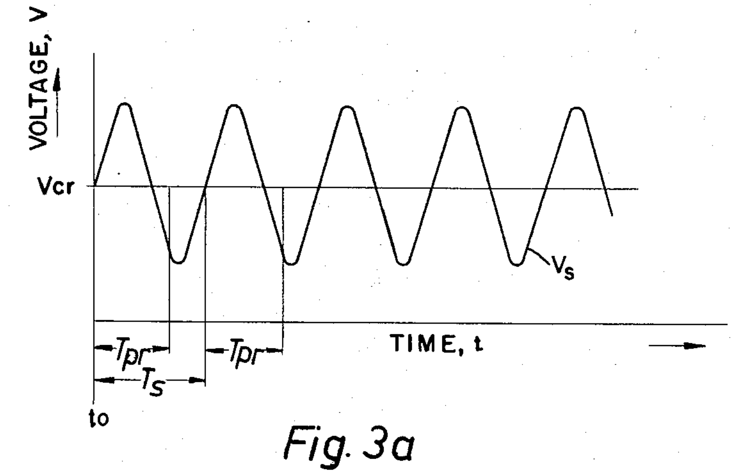

FIG. 3*a* is a diagram showing the manner in which one form of control is effected according to the present invention.

Figure 3B:
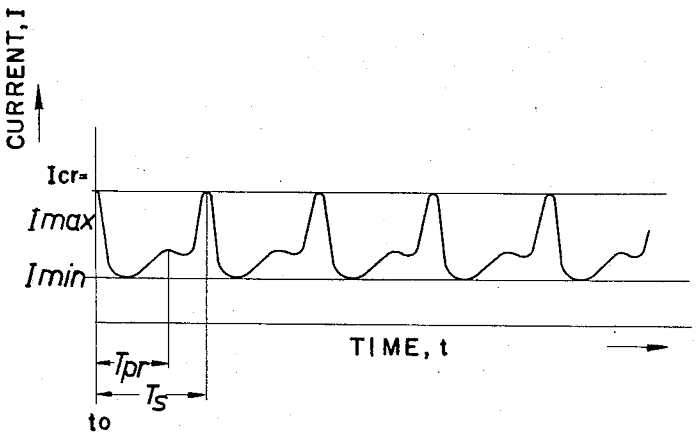

FIG. 3*b* is a diagram showing the effect of the control employed according to FIG. 3*a*.

Figures 4A, 4B, 5A, 5B:
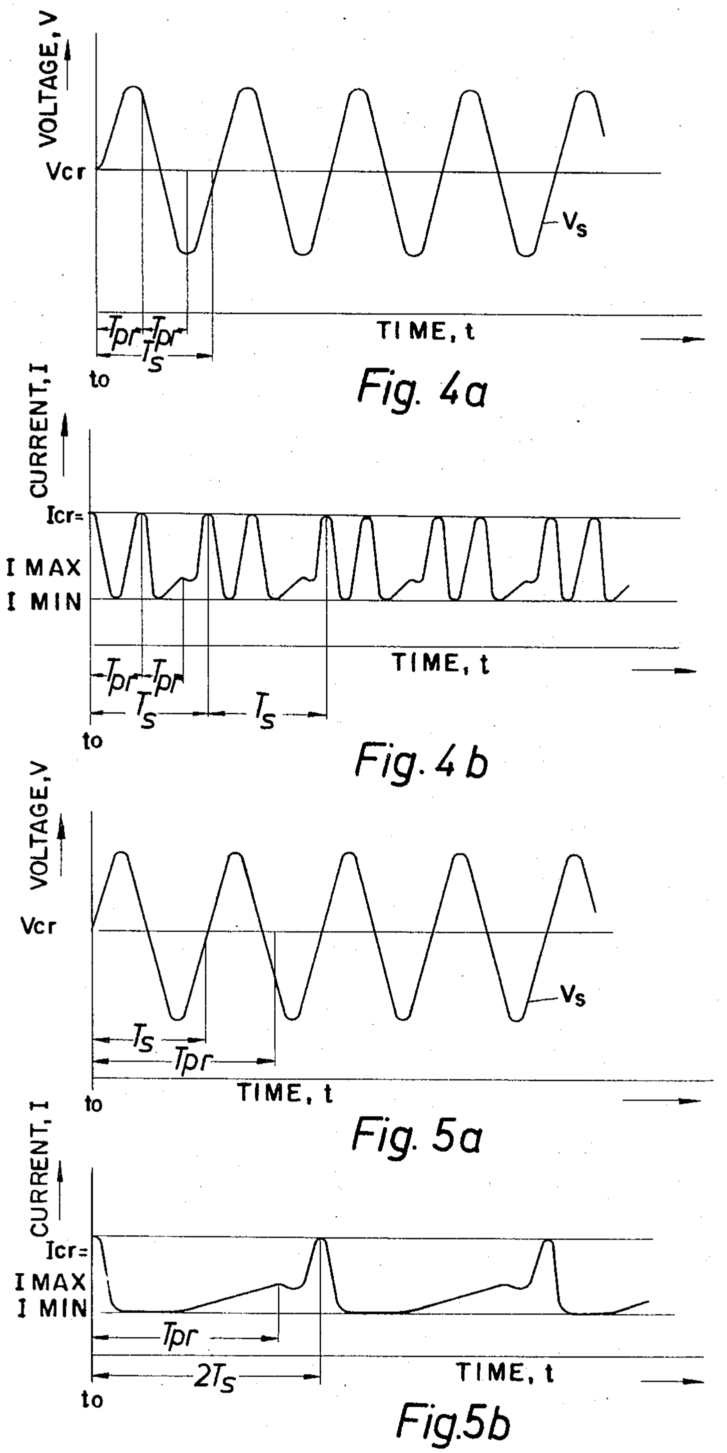

FIG. 4*a* is a diagram similar to that of FIG. 3*a* showing another form of control carried out according to the present invention.

FIG. 4*b* is a diagram similar to that of FIG. 3*b* showing the effect of the control according to FIG. 4*a*.

FIG. 5*a* is a diagram similar to that of FIG. 3*a* showing still another form of control according to the present invention.

FIG. 5*b* is a further diagram similar to that of FIG. 3*b* showing the effect of the control according to FIG. 5*a*.

Figure 6A:
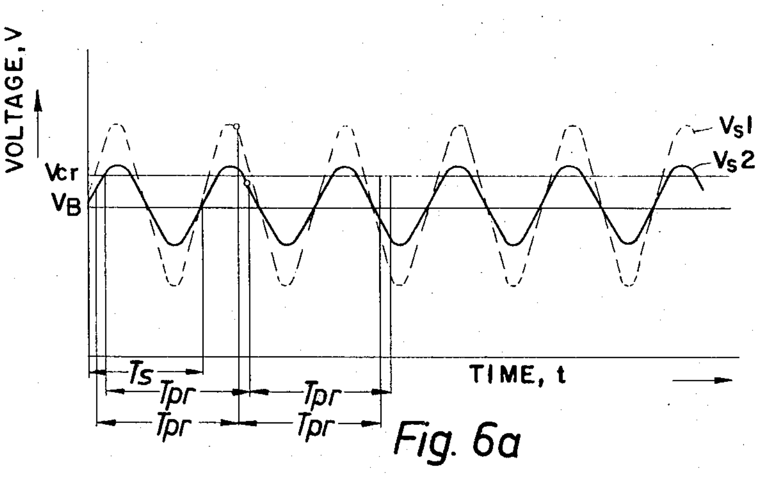

FIG. 6*a* is a diagram similar to that of FIG. 3*a* showing an additional form of control according to the present invention.

Figure 6B:
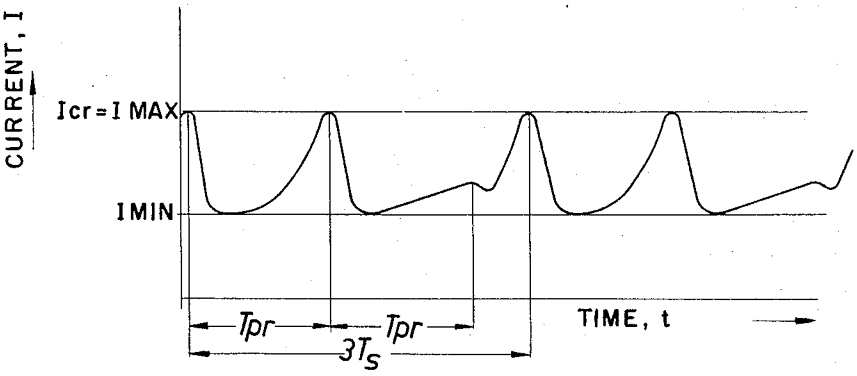

FIG. 6*b* is a diagram similar to that of FIG. 3*b* showing the effect of one form of control according to FIG. 6*a*.

Figure 6C:
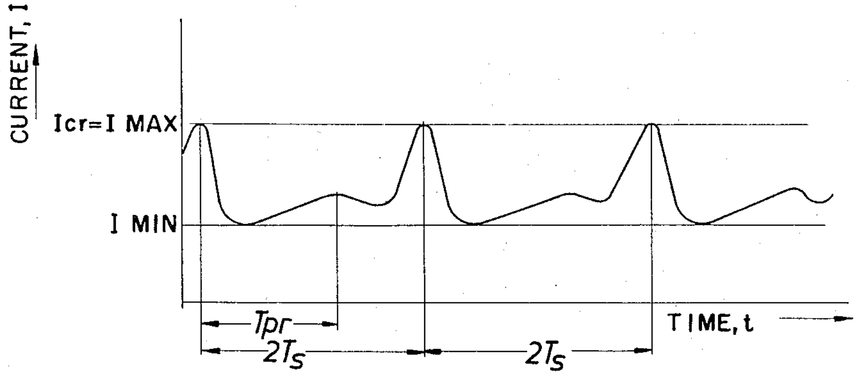

FIG. 6*c* is a diagram similar to that of FIG. 6*b* showing the effect of another form of control according to FIG. 6*a*.

Figure 7A:
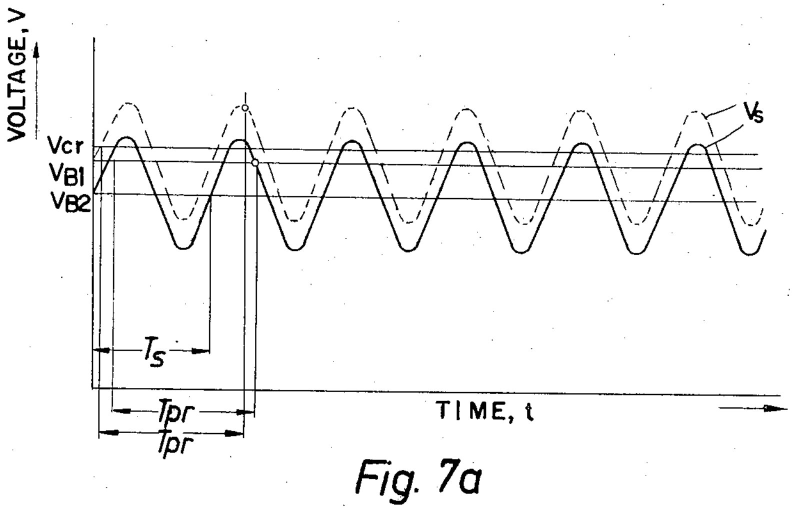

FIG. 7*a* is a diagram similar to that of FIG. 3*a* showing a still further form of control according to the present invention.

Figure 7B:
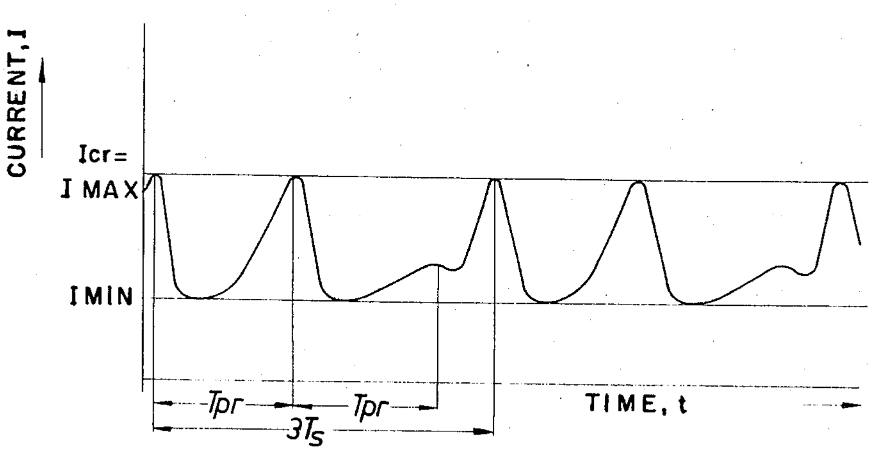

FIG. 7*b* is a diagram similar to that of FIG. 3*b* showing the effect of one form of control according to FIG. 7*a*.

Figure 7C:
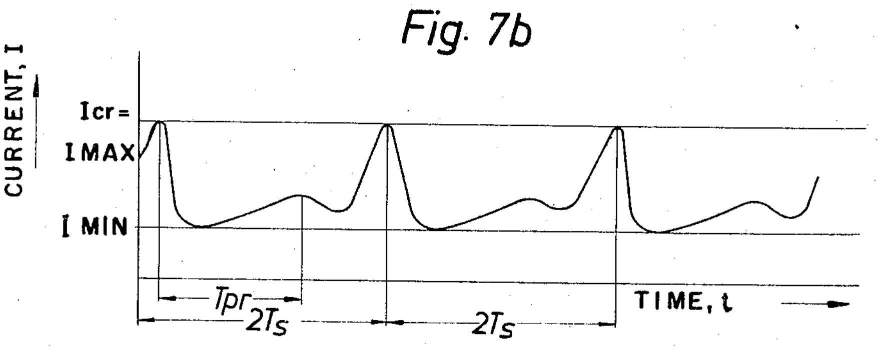

FIG. 7*c* is a diagram similar to that of FIG. 7*b* showing the effect of another form of control according to FIG. 7*a*.

Figure 8A:
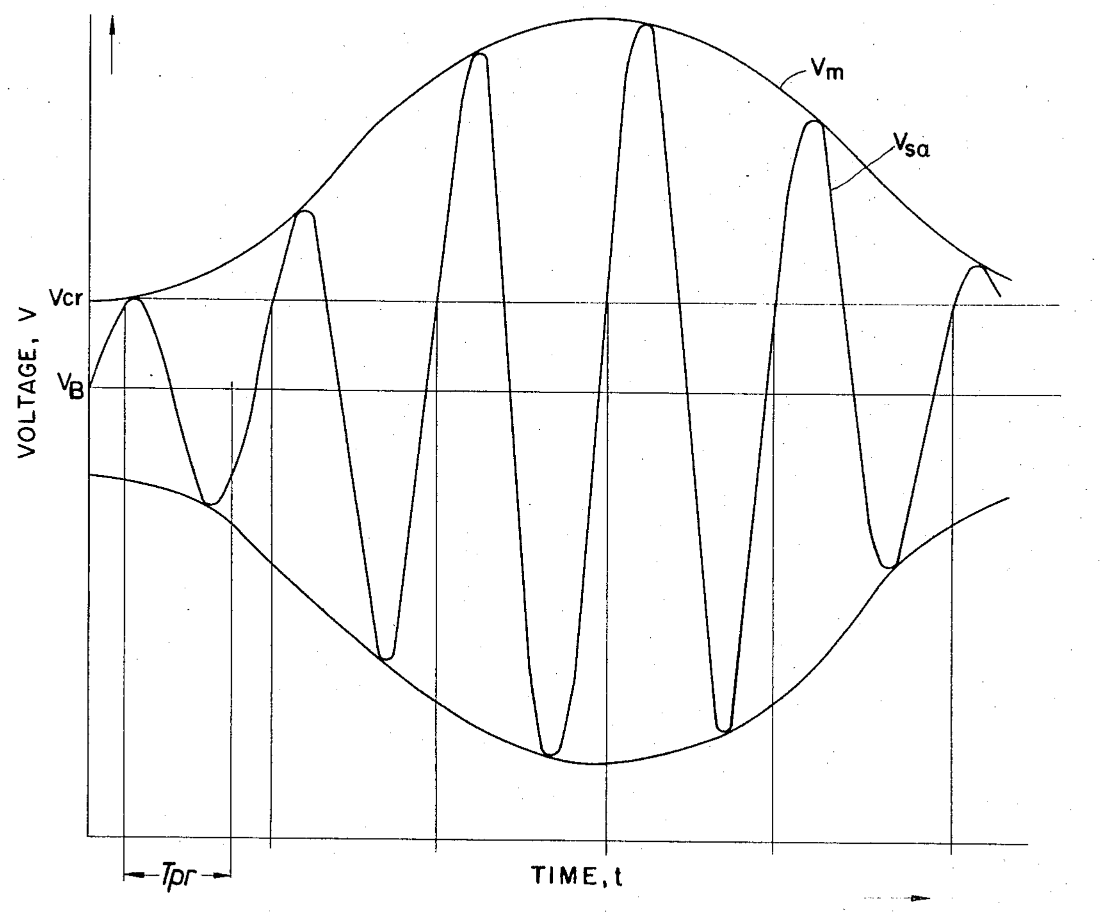

FIG. 8*a* is another diagram similar to that of FIG. 3*a* showing yet another form of control according to the present invention.

Figure 8B:
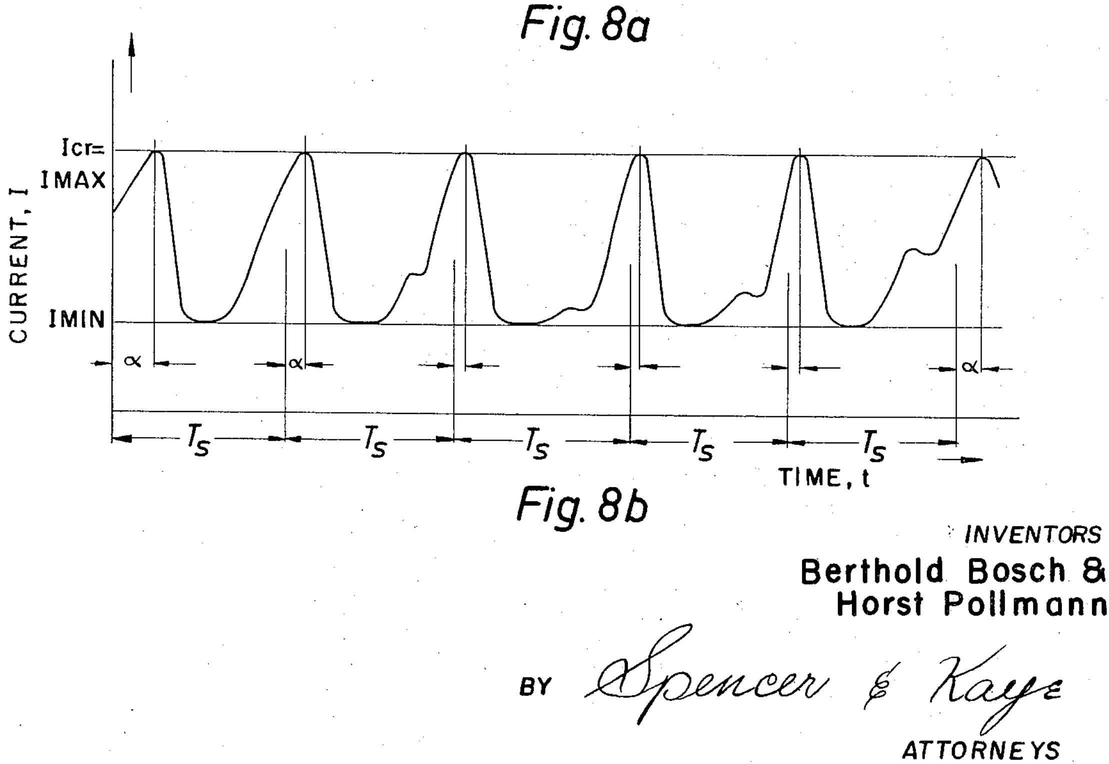

FIG. 8*b* is a diagram similar to that of FIG. 3*b* showing the effect of the control according to FIG. 8*a*.

Figure 9:
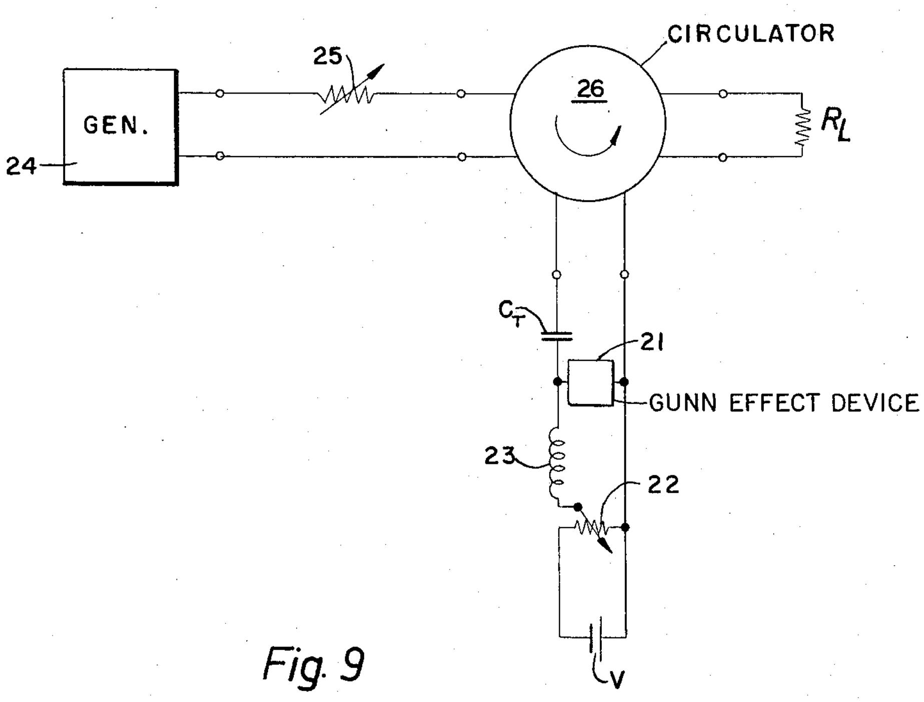

FIG. 9 is a circuit diagram of a first embodiment of the present invention.

Figure 10:
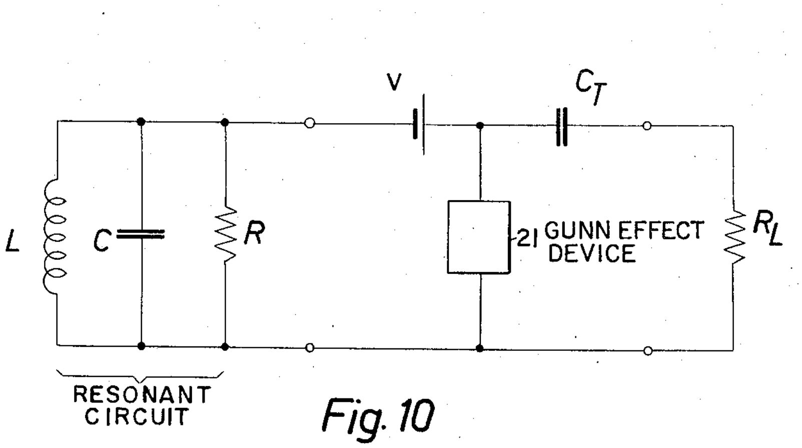

FIG. 10 is a schematic diagram showing another embodiment of the present invention.

Figure 11:
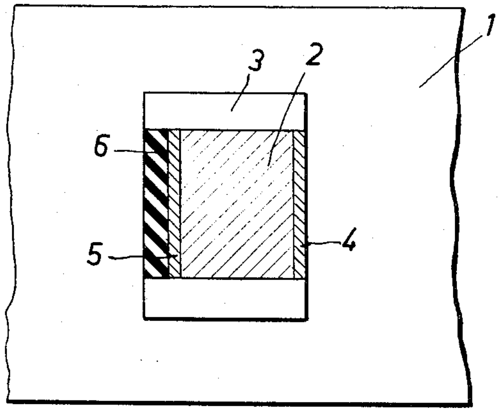

FIG. 11 is a partial, cross-sectional view of one form of Gunn-effect oscillator employed in embodiments of the present invention.

Figure 12:
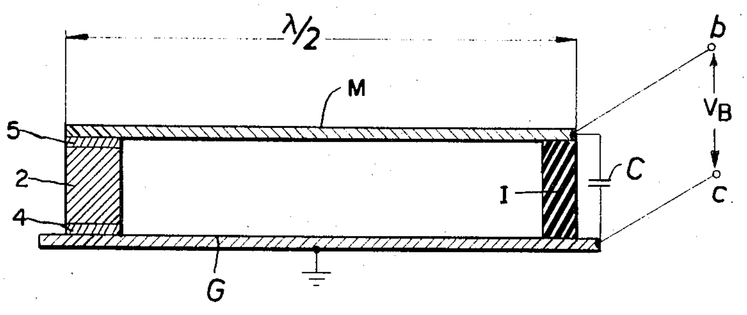

FIG. 12 is a cross-sectional view of a further embodiment of the present invention.

Figure 13:
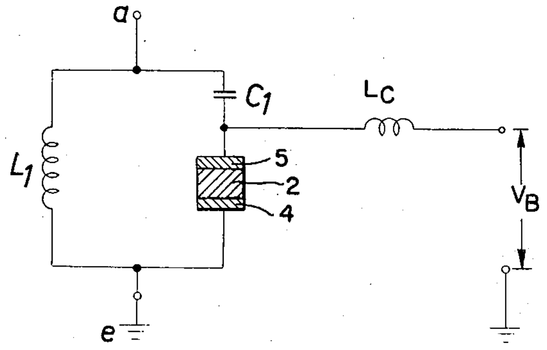

FIG. 13 is a schematic diagram of yet another embodiment according to the present invention.

Figure 14:
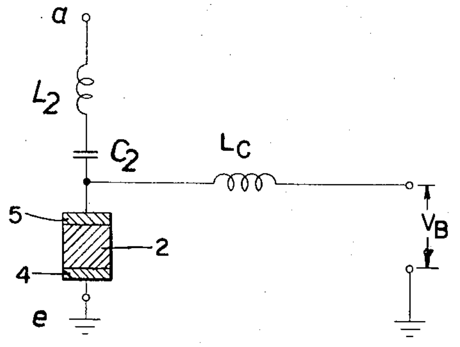

FIG. 14 is a schematic diagram of a further embodiment of the present invention.

It is known that in order to produce oscillations according to the Gunn effect, it is necessary to provide a crystal made of a suitable semiconductor, such as gallium arsenide or indium phosphide for example, having a suitable thickness, of the order of 10 to 200 $\mu$, with ohmic contacts on the two surfaces separated by its thickness dimension. These two contacts will serve as the cathode and anode, respectively, to which a suitable d.c. voltage source will be connected to produce the necessary electric field across the crystal.

Figure 1:
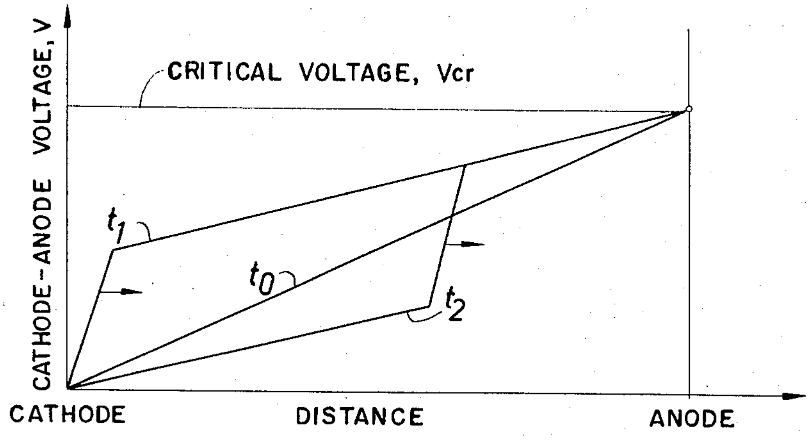
FIG. 1 is a diagram used in explaining the creation of oscillations in a semiconductor crystal according to the Gunn effect.

It has been experimentally established that when the voltage between the cathode and anode of such an arrangement attains a critical value, a zone of increased electric field intensity builds up at the cathode and then begins to move toward the anode. This is shown in FIG. 1 for the case of a constant voltage level across the crystal. The ordinate of FIG. 1 represents the voltage with respect to the cathode, while the abscissa of this figure is in terms of the distance from the cathode of the device. The curve $t_o$ shows the voltage distribution through the crystal at the instant the critical voltage $V_{cr}$ is just reached, this being the time $t_o$. Immediately thereafter, at the time $t_1$, the zone of increased electric field strength, or intensity, builds up at the cathode, giving the voltage distribution through the crystal the form represented by the curve $t_1$. This increased field intensity zone then commences to move toward the anode so as to give the voltage distribution through the crystal at some subsequent time $t_2$ the configuration shown by the curve $t_2$.

It may be seen that as the high electric field intensity zone moves toward the anode, the voltage levels outside the high field zone assume smaller values than those which existed at the time $t_o$ when the critical voltage $V_{cr}$ was first attained. This lower voltage prevents a new region of high field intensity from being generated at the cathode until the previous high intensity region has disappeared. Only after this first region, or high field intensity zone, has been dissipated, will the voltage distribution through the crystal be sufficient to cause the process to be repeated.

This cyclic building up of a local high field intensity region and movement of the region toward the anode creates a resulting current oscillation which appears in the circuit connected to the crystal.

Figure 2:
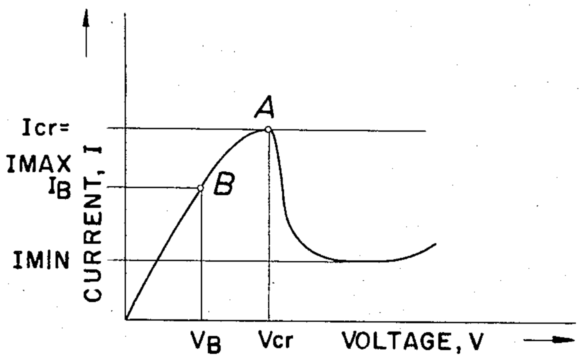
FIG. 2 is a diagram also used for explaining this operation.

Referring now to FIG. 2, there is shown a curve representing the current vs. voltage characteristic of the semiconductor crystal. This curve shows that as the voltage across the crystal increases from zero to a value of $V_B$, the current increases linearly from zero to a value of $I_B$. As the voltage increases beyond this point B, the curve becomes non-linear due to the decrease in charge carrier mobility at higher field strengths. This non-linear behavior increases until the point A is reached where the voltage across the crystal has the critical value $V_{cr}$, the current at this point being equal to $I_{cr}$. At this point, current oscillations begin within the crystal and the current through the crystal varies in a periodic manner between the value $I_{max} = I_{cr}$ and $I_{min}$.

The present invention seeks to control the oscillations produced by such a device by bringing the frequency of the oscillations produced in the crystal into a desired relation to the frequency of a superimposed oscillation constituted by an a.c. control voltage whose field extends parallel to the direction of travel of the charge carriers in the crystal in such a manner as to produce a controlled variation of the voltage between the cathode and anode contacts of the crystal above and below the critical oscillation-inducing voltage $V_{cr}$. By creating various relationships between the natural oscillation frequency of the crystal and the frequency and amplitude of the superimposed oscillation, it is possible to produce many different types of results.

According to one application of the present invention, the frequency of the oscillations produced in the semiconductor crystal can be synchronized to the frequency or phase of the externally applied a.c. voltage. For this purpose, as for other applications according to the present invention, a d.c. voltage $V_{cr}$ having a level equal to the critical voltage for inducing oscillations in the crystal is applied between the cathode and anode thereof together with a superimposed a.c. control voltage $V_s$. The resulting voltage applied across the crystal is represented by the curve shown in FIG. 3a. This curve is given in terms of the voltage across the crystal with respect to time, with the average value of the curve being equal to $V_{cr}$, which is the voltage produced by the d.c. source.

The time $T_{pr}$ represents the period of the natural oscillations in the crystal, while the time $T_s$ represents the period of oscillation of the superimposed control voltage $V_s$. In order to produce the desired synchronization, it is necessary for the following relation to exist:

$$T_s > T_{pr} > \tfrac{1}{2} T_s, \text{ or } f_s < f_{pr} < 2 f_s,$$

where $f_{pr}$ represents the natural oscillation frequency of the crystal and $f_s$ represents the frequency of the control voltage.

When this relationship exists, one oscillation crystal will be produced in the crystal at the start of each cycle of the control voltage, i.e., each time the sum of the a.c. control voltage and the d.c. voltage exceeds the value $V_{cr}$. The current waveform appearing at the output of the crystal oscillator is shown in FIG. 3b. It may be seen from FIGS. 3a and 3b that at the time $t_o$, which corresponds to the origin of the abscissa of FIGS. 3a and 3b, the voltage across the crystal exceeds $V_{cr}$ and one oscillation cycle is produced in the crystal. This causes the current output from the crystal to pass rapidly from the value $I_{max}$ to the value $I_{min}$ and then to once again begin rising toward the value $I_{max}$. At the end of a time period equal to $T_{pr}$, the local high field intensity region in the crystal has reached the anode and the crystal is once again in condition to produce another current oscillation However, at this instant the voltage across the crystal is less than $V_{cr}$, so that a new oscillation can not be produced. Only after the control voltage has gone through a full cycle, i.e., only after a time period of $T_s$ from the previous current oscillation, will the voltage across the crystal once again reach a value at which a new current oscillation, or pulse, will be produced. As may be seen from FIG. 3b, the resulting current output from the crystal will be in the form of a series of oscillations, or pulses, having a frequency $f_s$ equal to the frequency of oscillation of the control voltage $V_s$. It may also be seen that the control voltage oscillates around the operating point A of the characteristic curve of FIG. 2.

If the operating point for the crystal is maintained at the point A of FIG. 2, and the frequency of the control voltage $V_s$ is varied so as to create the relationship:

$$T_{pr} < T_s/2 \text{ , or } f_{pr} > 2 f_2,$$

such as is shown for the voltage waveform of FIG. 4a, the current output from the oscillator will have the form shown by the current waveform in FIG. 4b. As may be seen from a comparison of the curves of FIGS. 4a and 4b, the resulting output will be a series of pulse pairs, with the time interval between the pulses of each pair being equal to $T_{pr}$, and the period of the resulting output being equal to $T_s$. It may therefore be seen that this relationship also produces a type of frequency synchronization of the current oscillation frequency with the control voltage frequency.

It is also possible to select a proper relationship between the natural oscillation period of the crystal and the control voltage period to produce a frequency division of the control voltage. If, for example, with the control voltage applied to the crystal being varied about the operating point A of FIG. 2, the relationship between the control voltage frequency and the natural oscillating frequency of the crystal is chosen so that:

$1.5\ T_s < T_{pr} < 2\ T_s$, or $0.5 f_s < f_{pr} < 0.66 f_s$, a voltage having the form shown in FIG. 5a will appear across the crystal and will produce an output current having the form shown in FIG. 5b. At the beginning of operation, when the voltage $V_s$ first exceeds zero, thus causing the voltage across the crystal to exceed $V_{cr}$, a current oscillation will be induced in the crystal, causing the current through the crystal to fall to $I_{min}$ and to then begin rising for a time equal to $T_{pr}$. At the end of this latter time period, however, the voltage across the crystal is below $V_{cr}$ so that a new oscillation can not be produced until the start of the following cycle of the control voltage $V_s$. Because of the relation between the natural oscillating frequency $f_{pr}$ of the crystal and the frequency $f_s$ of control voltage $V_s$, this next current oscillation in the crystal will occur after the control voltage has gone through two cycles. Therefore, the current oscillations produced by the crystal will have half the frequency of the control voltage $V_s$.

If now the value of the d.c. voltage is adjusted to a level corresponding to the point B of the curve of FIG. 2, and if the relationship between the control voltage frequency and the natural oscillation frequency of the crystal is:

$$T_s < T_{pr} < 2\ T_s\text{, or } f_s > f_{pr} > f_s/2,$$

the voltage across the crystal will have the form shown in FIG. 6a. The frequency of the resulting current oscillations can then be varied by varying the peak value of the control voltage $V_s$. FIG. 6a shows two possible control voltages $V_{s1}$ and $V_{s2}$. Because the d.c. voltage across the crystal is below the critical voltage $V_{cr}$, a current oscillation will not be produced in the crystal when the control voltage $V_s$ merely exceeds zero, but will occur a short time thereafter when the amplitude of the control voltage has increased by a sufficient amount to cause the total voltage across the crystal to exceed the value $V_{cr}$. Therefore, by controlling the peak amplitude of the control voltage it is possible to vary the time delay between the instant when the control voltage exceeds zero and the instant when a current oscillation is produced in the crystal. The current oscillation waveform produced by the crystal when the control voltage $V_{s1}$ is applied is shown in FIG. 6b. As may be seen in this figure, the amplitude of the control voltage $V_{s1}$ is sufficient to cause the output current from the crystal to be a series of pulse pairs and to have a frequency equal to one-third $f_s$. When a lower control voltage $V_{s2}$ is used, the resulting current oscillation output from the crystal, which is shown in the curve of FIG. 6c, has a frequency of one-half that of the control voltage.

If the frequency division process is considered not as a function of the amplitude of the control voltage itself, but rather as a function of the level of the d.c. voltage with respect to the critical voltage $V_{cr}$, a frequency division with respect to the frequency of the control voltage $V_s$, can be effected by employing a control voltage having a constant peak value and a d.c. voltage having a varying level. This is shown in FIG. 7a for a control voltage $V_s$ combined with a d.c. voltage having various levels below the value $V_{cr}$, such as the levels $V_{B1}$ and $V_{B2}$. In this case, the value of the frequency division obtained will be determined by the level of the d.c. voltage. When the d.c. voltage has the value $V_{B1}$, the voltage across the crystal will have the form shown by the dotted curve of FIG. 7a and will produce a current oscillation having the form shown in FIG. 7b. As may be seen from FIG. 7b, the result is a current oscillation waveform which may again be considered to have the form described above in connection with FIG. 6b. If the d.c. voltage is now further reduced to the value $V_{B2}$ of FIG. 7a, the voltage across the crystal will have the form shown by the solid curve of FIG. 7a and will produce a current oscillation waveform of the type shown in FIG. 7c. As may readily be seen, this current oscillation has a frequency, or repetition rate, equal to one-half the frequency of the control voltage $V_s$.

In general it may be stated that in order to obtain a frequency division by thirds, either by varying the amplitude of the control voltage $V_s$ or the level of the d.c. voltage, it is necessary to create a condition wherein each local high intensity field reaches the anode at an instant when the voltage across the crystal is higher than the critical voltage $V_{cr}$, while for a frequency division by two this local high field intensity zone must reach the anode at an instant when the voltage across the crystal is below the critical voltage.

According to another application of the present invention, it is possible to produce a scanned oscillation signal by interrupting the crystal oscillations at a predetermined rate. This can be achieved, for example, by switching off the applied d.c. voltage at the desired rate, or at least by decreasing its level at that rate, in such a manner as to cause a complete disappearance of the crystal oscillations. To this end, it is also possible to select a d.c. working voltage of zero volts and to employ the alternating control voltage as the sole voltage source across the crystal.

The present invention can also be utilized for converting from one form of modulation to another. For example, a crystal which is capable of producing oscillations according to the Gunn effect may have applied across its electrodes a d.c. voltage $V_B$ whose level is somewhat below the critical voltage $V_{cr}$ required for inducing oscillations in the crystal, such as is shown in FIG. 8a. An a.c. voltage $V_s$ may then be superimposed on the d.c. voltage $V_B$, the frequency $f_s$ of this voltage being such that the following relationship exists:

$$2 f_s > f_{pr} > f_s.$$

A modulating voltage $V_m$ is then impressed on the a.c. voltage to produce an amplitude modulated voltage $V_{sa}$ superimposed on the d.c. voltage $V_B$. The amplitude modulating voltage $V_m$ is so chosen that the sum of the smallest peak amplitude of modulated voltage $V_{sa}$ and the d.c. voltage $V_b$ will exceed the critical voltage $V_{cr}$ required for producing oscillations in the crystal. As a result, each cycle of the modulated voltage $V_{sa}$ will induce one oscillation pulse in the crystal.

Moreover, the relative amplitude of each cycle of the modulated voltage $V_{sa}$ will determine the phase angle between the start of the cycle and the instant at which that cycle will produce such a Gunn effect oscillation. In other words the amplitude modulated voltage $V_{sa}$ will produce an angular modulation a phase modulation or frequency modulation, of the oscillations produced in the crystal.

This is shown most clearly in the crystal output current waveform of FIG. 8b. As this figure shows, each cycle of the alternating voltage $V_{sa}$ produces a current pulse in the output from the crystal, the phase angle $\alpha$ between the start of each voltage cycle and the current pulse produced by that cycle varying inversely with the peak amplitude of the alternating voltage cycle. This result is of course due to the fact that the slope, or rate of change, of each cycle of the voltage $V_{sa}$ is directly proportional to the peak amplitude of that cycle. It thus results that an amplitude-to-phase modulation is produced.

It should of course be appreciated that many other types of operation can be produced according to the present invention and that those described above are only presented by way of example.

Turning now to FIG. 9, there is shown a circuit diagram of one embodiment of the present invention which may be used to produce the various types of operation described above. This circuit includes a semiconductor crystal 21 of the type described previously which is capable of producing oscillations according to the Gunn effect when a sufficiently high voltage is applied across its terminals to produce the required critical field strength. The d.c. voltage for this crystal is supplied from a voltage source V to which the crystal is connected through the intermediary of a voltage level control potentiometer 22 and a r.f. choke coil 23. The a.c. voltage to be applied across the crystal 21 is produced by a suitable generator 24 whose output is connected in series with a variable attenuator 25. The output from generator 24 is connected to a suitable microwave circulator 26 which is also connected to the crystal 21 through a d.c. blocking capacitor $C_T$, and to a load $R_L$. Circulator 26 operates in a well-known manner to permit the output from generator 24 to be delivered only to the leads across crystal 21 and to permit the resulting output current oscillations from crystal 21 to be delivered only to load $R_L$. By varying the frequency and amplitude of the output from generator 24, the latter being variable by means of a attenuator 25, and by varying the level of the d.c. voltage across crystal 21 by adjusting potentiometer 22, it is possible to produce any one of the operations previously described.

It is also possible, in accordance with a further feature of the present invention, to produce a suitable arrangement in which the crystal 21 is disposed directly in a structure which is capable of resonating.

Due to its very simple structure, a controlled oscillator of the type shown in FIG. 9 could be made to serve quite well as a pump for a parametric amplifier, in which case the load $R_L$ of FIG. 9 could be considered as the parametric amplifier portion to which the pump output is connected.

Referring now to FIG. 10, there is shown a simplified embodiment of the present invention in which the a.c. voltage generator is replaced by a resonant circuit constituted by the elements L, C and R. The resonant frequency of the RLC circuit is given a value, with respect to the inherent oscillating frequency of crystal 21, such that the resonant circuit can supply an a.c. voltage capable of controlling the output of crystal 21 in the same manner as the output from generator 24 of FIG. 9.

In this embodiment, the crystal 21 is supplied with a d.c. voltage from voltage source V and the resonant RLC circuit is connected across the crystal terminals. Also connected across the crystal is a load $R_L$ in series with a d.c. blocking capacitor $C_T$.

In operation, an initial increase in the voltage applied to the resonant circuit will be produced only by noise voltage or by a switch-on current surge. This will be sufficient to cause the desired resonant alternating voltage to build up in the resonant circuit. When the voltage across the resonant circuit reaches the necessary amplitude, it will cause oscillations to be produced in the crystal 21 at a frequency which is synchronized with the resonant frequency of the resonant circuit. Thus, this arrangement permits an effective synchronization of the current oscillations produced in the crystal 21 without requiring the provision of an additional oscillator. If, with this arrangement, the relationship between the period $T_{pr}$ of free oscillation of the crystal 21 and the period $T_s$ of the resonant circuit is such that:

$$T_s > T_{pr} > T_s/2,$$

and if the resonant frequency of the resonant circuit can be varied by a suitable amount, it is possible to obtain a one octave frequency variation of the output current oscillations from the crystal. In this case, the output frequency from the crystal can be varied between its natural oscillating frequency $f_{pr}$ and one half this frequency.

In another form of construction according to the present invention, the Gunn effect crystal may be coupled to a resonator in such a manner that the high frequency resonator current traverses the crystal in a direction parallel to the direction of flow of charge carriers through the crystal. In this embodiment also, the resonator is tuned to the desired control voltage frequency in order to produce the desired crystal oscillation frequency.

Since the frequency range with which the present invention is concerned is such that the dimensions of the semiconductor samples are relatively small, it is also possible, according to a further feature of the present invention, to install the Gunn effect crystal in a recess in the wall of a resonator so as to produce a relatively high degree of coupling between the crystal and the resonator and so as to simplify the mechanical handling of the total arrangement. When arranging the crystal in this manner, it is necessary to take particular care to assure that the d.c. voltage applied across the crystal is not short-circuited. This protection can be achieved, for example, by installing a thin layer of insulating material between the resonator wall and at least one of the ohmic contacts to the crystal.

Referring now to FIG. 11, there is shown a simplified representation of one manner in which the Gunn effect crystal 2 can be installed in a resonator wall 1. As is shown therein, the resonator wall 1 is provided with a suitable recess 3 in which the semiconductor crystal 2 is disposed. The crystal is so oriented in the resonator wall that the resonator wall currents pass through the crystal in a direction parallel to the drift direction of charge carriers therethrough. The crystal is provided with ohmic contact terminals 4 and 5, with the terminal 5 being separated from the resonator wall 1 by a suitable d.c. current insulating layer 6.

The resonator in which the crystal 2 is disposed is arranged to be a cavity resonator for the frequencies at which it is desired to operate. For special application purposes, and particularly at relatively low frequencies, the resonator may be constructed, in accordance with a further feature of the present invention, according to the strip-line technique, with the Gunn effect crystal oriented in such a manner that the current of the strip-line arrangement traverses the crystalin a direction substantially parallel to the direction of movement of charge carriers through the crystal.

An arrangement of this type is shown in FIG. 12 wherein a crystal 2 having ohmic contact terminals 4 and 5 is arranged between the two conductors of a strip-line resonant circuit. The conductor G of the strip-line arrangement is connected to ground and has that end which is opposite from the end to which the crystal is attached provided with an insulating support I which supports the second conductor M in such a manner as to maintain a constant distance between the conductors M and G. The length of the arrangement shown in FIG. 12 is of the order of $\lambda/2$, where $\lambda$ equals the wavelength of the resonant frequency of the strip-line, this being equal to the desired frequency of the control voltage to be applied across the crystal 2. A capacitor C is connected between the conductors M and G, at the end of the strip-line which is opposite from crystal 2, for providing a high frequency short-circuiting of the strip line. The crystal 2 is disposed between the conductors G and M in such a manner that at least part of the strip-line resonant circuit current flows through the crystal in a direction substantially parallel to the direction of flow of charge carriers therethrough, this resonant circuit current acting to produce current oscillations in the crystal. The necessary ohmic connection between the conductors G and M and the crystal 2 is provided by the ohmic contacts 4 and 5 respectively. The provision of these contacts 4 and 5 permits the conductors G and M to serve as d.c. conductors for the d.c. voltage $V_B$ supplied to the crystal 2 from the input terminals b and c.

In another form of construction according to the present invention, the crystal 2 could alternatively be disposed in a recess formed in one of the conductors of the strip line, in which case one of the ohmic contacts to the crystal would have to be insulated with respect to direct current from the conductor so as to permit a d.c. voltage to be applied across the crystal.

It is also possible to provide a resonant circuit for the crystal which is constituted by lumped elements, such as is shown in FIG. 13. In this arrangement, the crystal 2 is connected into the circuit in such a manner that the necessary d.c. voltage $V_B$ can be applied across the terminals 4 and 5. The arrangement of FIG. 13 includes a parallel resonant circuit composed of inductance $L_1$ and capacitance $C_1$. The two connection points for the resonant circuit are indicated by a and e, and the crystal 2 is connected in series with the capacitance $C_1$. To the junction point between capacitance $C_1$ and crystal 2 there is connected a choke coil $L_c$ to which one terminal of a source supplying d.c. voltage $V_B$ is connected. The other end of the voltage source is connected to ground, as is the other terminal 4 of crystal 2. The provision of the choke coil $L_c$ assures that the d.c. voltage component across the crystal will be maintained substantially constant, while high frequency oscillations will be effectively prevented from passing to the d.c. voltage source.

Referring now to FIG. 14, there is shown another arrangement according to the present invention which is identical with that of FIG. 13 with the exception that the parallel resonant circuit is replaced by a lumped parameter series resonant circuit composed of inductance $L_2$ and capacitance $C_2$. The crystal 2 is connected in series with this resonant circuit with the terminal 5 of crystal 2 connected to capacitance $C_2$ and the terminal 4 of the crystal connected to ground at the connection point *e*. Here again there is provided a choke coil $L_c$ between the junction point of crystal 2 and the resonant circuit and one terminal of the d.c. voltage source supplying a voltage $V_B$.

In accordance with a further development of the present invention, the resonant circuit to which the crystal is connected can be provided with elements whose value can be varied in order to vary the resonant frequency of the circuit. This result can be produced in several ways. For example, it is possible to effect a mechanical variation of the values of these elements or to effect a thermal variation thereof. According to an especially advantageous form of construction, the effective value of one or more of these resonant circuit elements could be varied electronically, for example, by utilizing a reactance tube for the resonant circuit reactance of a capacitive diode for the circuit capacitance. These possibilities are indicated in FIG. 14 wherein the elements $L_2$ and $C_2$ are shown as being variable.

It will be understood that the above description of the present invention is susceptible to various modifications, changes, and adaptations.

What is claimed is:

1. In combination with a semiconductor crystal of given dimensions made preferably of a III-V compound of the type which produces current oscillations having a predetermined natural oscillation frequency by the Gunn effect when a sufficient voltage is applied between two opposed surfaces thereof to produce an electric field extending between said surfaces and having a field strength which exceeds a critical value, oscillation control means including first voltage supply means connected between said crystal surfaces for producing, in said crystal, an electric field having a value not substantially greater than the critical field strength value, and second voltage supply means connected between said crystal surfaces for applying a high control voltage across said crystal of sufficient amplitude to vary the field strength in said crystal between an amount which is less than said critical strength and an amount which exceeds said critical strength for controlling the frequency of the current oscillations produced in said crystal.

2. An arrangement as defined in claim 1 wherein said first voltage supply means are arranged for applying a d.c. voltage to said crystal.

3. An arrangement as defined in claim 2 wherein the frequency of said high frequency control voltage is within a frequency range extending between the natural oscillation frequency of said crystal and one-half said natural oscillation frequency.

4. An arrangement as defined in claim 2 wherein the frequency of said high frequency control voltage is less than half the natural oscillation frequency of said crystal.

5. An arrangement as defined in claim 1 wherein the frequency of the high frequency control voltage produced by said second voltage supply means is so related to the natural oscillation frequency of said crystal as to cause the resulting current oscillations produced by said crystal to have a frequency which is an integral submultiple of the frequency of said high frequency control voltage.

6. An arrangement as defined in claim 5 wherein said first voltage supply means are arranged to apply a d.c. voltage between said surfaces of said crystal, the voltage supplied across said crystal by said first voltage supply means having a value sufficient to create an electric field in said crystal having said critical field strength value, and the frequency of said high frequency control voltage being less than two times the natural oscillation frequency of said crystal and greater than one-half said natural oscillation frequency, whereby the frequency, of the resulting current oscillations produced in said crystal is equal to one-half the frequency of the high frequency control voltage provided by said second voltage supply means.

7. An arrangement as defined in claim 5 wherein said first voltage supply means are arranged to apply a d.c. voltage between said crystal surfaces, the voltage applied across said crystal by said first voltage supply means being sufficient to create an electrical field in said crystal having a field strength which is less than said critical value, the frequency of said high frequency control voltage being less than two times the natural oscillation frequency of said crystal and greater than the natural oscillation frequency thereof, and the high frequency control voltage provided by said second voltage supply means having an amplitude sufficient to cause the frequency of the resulting current oscillations produced in said crystal to be equal to one-half the frequency of said high frequency control voltage.

8. An arrangement as defined in claim 5 wherein said first voltage supply means are arranged to apply a d.c. voltage between said crystal surfaces, the voltage applied to said crystal by said first voltage supply means producing an electric field in said crystal having a field strength which is less than said critical value, the frequency of the high frequency control voltage provided by said second voltage supply means being less than two times the natural oscillation frequency of said crystal and greater than the natural oscillation frequency there-of, and the amplitudes of the voltages produced by said first voltage supply means and said second voltage supply means being sufficient to cause the frequency of the resulting current oscillations produced in said crystal to be less than the frequency of the voltage produced by said second voltage supply means and to be an integral multiple of one-third the frequency of said high frequency control voltage.

9. An arrangement as defined in claim 1 wherein said oscillation control means further comprises amplitude modulating means connected to amplitude modulate said high frequency control voltage.

10. An arrangement as defined in claim 9, wherein said means for amplitude modulating said high frequency control voltage act to cause the current output from said crystal to be angularly modulated in accordance with the amplitude modulation applied to said high frequency control voltage, said first voltage supply means being arranged to apply a d.c. voltage between said crystal surfaces, the amplitude of the voltage applied by said first voltage supply means being less than that required for causing the field strength across said crystal to exceed said critical value, the frequency of the voltage applied by said second voltage supply means having a value which is less than the natural oscillation frequency of said crystal and greater than one-half said natural oscillation frequency and the sum of the amplitude of the voltage provided by said first voltage supply means and the lowest peak amplitude of said amplitude modulated frequency control voltage being greater than the voltage required to produce an electric field across said crystal whose field strength exceeds said critical value.

11. An arrangement as defined in claim 1 wherein said first voltage supply means are arranged to apply a d.c. voltage between said crystal surfaces, and said oscillation control means further comprise a three arm circulator having one arm connected across said crystal, a second arm connected across the output of said second voltage supply means, and a third arm for connection to a load circuit.

12. An arrangement as defined in claim 1 wherein said second voltage supply means comprises a frequency variable resonant circuit connected between said crystal surfaces for producing a high frequency control voltage having a frequency equal to the resonant frequency of said circuit.

13. An arrangement as defined in claim 1, further comprising a resonator device to which said crystal is operatively coupled to cause at least a portion of the resonant current flowing through said resonator device pass through said crystal in a direction substantially parallel to the direction of movement of charge carriers through said crystal under the influence of a voltage applied between its said opposed surfaces.

14. An arrangement as defined in claim 13 wherein said resonator device includes at least one wall having a recess in which said crystal is disposed.

15. An arrangement as defined in claim 13 wherein said resonator device is constituted by a cavity resonator.

16. An arrangement as defined in claim 13 wherein said resonator device is constituted by a resonant strip line including two strip conductors between said crystal is disposed.

17. An arrangement as defined in claim 16 wherein said crystal is mounted to be movable along the length of said strip line for varying to resonant frequency of said line.

18. An arrangement as defined in claim 1 wherein said second voltage supply means are constituted by a lumped parameter resonant circuit into which said crystal is connected for receiving a high frequency control voltage constituted by the resonant frequency voltage of said circuit, and said first voltage supply means are connected to apply a d.c. voltage between said crystal surfaces.

19. An arrangement as defined in claim 18 wherein said lumped parameter circuit is constituted by reactances whose values are variable for varying the frequency of the high frequency control voltage which said circuit applies across said crystal.

20. A Gunn effect oscillator comprising, in combination:

a. a preferably III-V-compound semiconductor crystal of given dimensions of the type which produces current oscillations when the strength of an electric field produced by a first voltage supply means and applied between two ohmic contacts on said crystal exceeds a critical value; and b. means for applying across said crystal a high frequency control voltage to create an electric field the direction of which is parallel to the direction of movement of charge carriers in said crystal, the amplitude of said control voltage being sufficient to cause the field strength across said crystal to vary from a point below said critical field strength to a point thereabove, whereby said high frequency control voltage controls the current oscillations produced by said crystal.

21. In an oscillator circuit of the type which includes a body of single conductivity type semiconductor material, to which there is applied an electric field above a threshold field at which the body exhibits a negative resistance characteristic due to a change in the mobility of the conduction carriers in the body, to produce output high frequency oscillations in an output connected to the body, the improvement comprising:

a. input means connected to said body for applying an input voltage across the body which causes the threshold field for the body to be exceeded and said high frequency oscillations to be produced;

b. said input means including means connected to said body forming a driving circuit resonant at a frequency lower than the frequency of said high frequency output oscillations;

c. said negative resistance exhibited by said body when said threshold is exceeded to produce said high frequency oscillations causing the voltage in said driving circuit to resonate at said lower frequency.

* * * * *

UNITED STATES PATENT OFFICE

CERTIFICATE OF CORRECTION

PATENT NO. : 3,796,969

DATED : March 12th, 1974

INVENTOR(S) : Berthold Bosch et al

It is certified that error appears in the above-identified patent and that said Letters Patent are hereby corrected as shown below:

In the heading of the patent, under [75] Inventors:, change "Ehrestein/Ulm" to --Ehrenstein/Ulm--.

Column 4, line 25, change "crystal" to --cycle--; line 41, change "tion" to --tion.--; line 58, change "$2f_2$" to --$2f_s$--.

Column 7, line 3, after "modulation" (first occurrence) insert --, i.e.--; line 46, delete "a"; line 52, change "produce" to --provide--.

Column 9, line 11, change "crystalin" to --crystal in--.

Column 10, line 29, change "of" to --or--; line 49, after "high" insert --frequency--.

Column 11, line 48, change "there-of" to --thereof--.

Column 12, line 10, after "modulated" insert --high--; line 31, after "device" insert --to--; line 44, after "between" insert --which--; line 48, change "to" to --the--.

Signed and sealed this 22nd day of April 1975.

(SEAL)
Attest:

RUTH C. MASON
Attesting Officer

C. MARSHALL DANN
Commissioner of Patents
and Trademarks